No. 677,585. Patented July 2, 1901.
R. McCLASKEY.
VEHICLE.
(Application filed Jan. 23, 1901.)
(No Model.) 2 Sheets—Sheet 1.
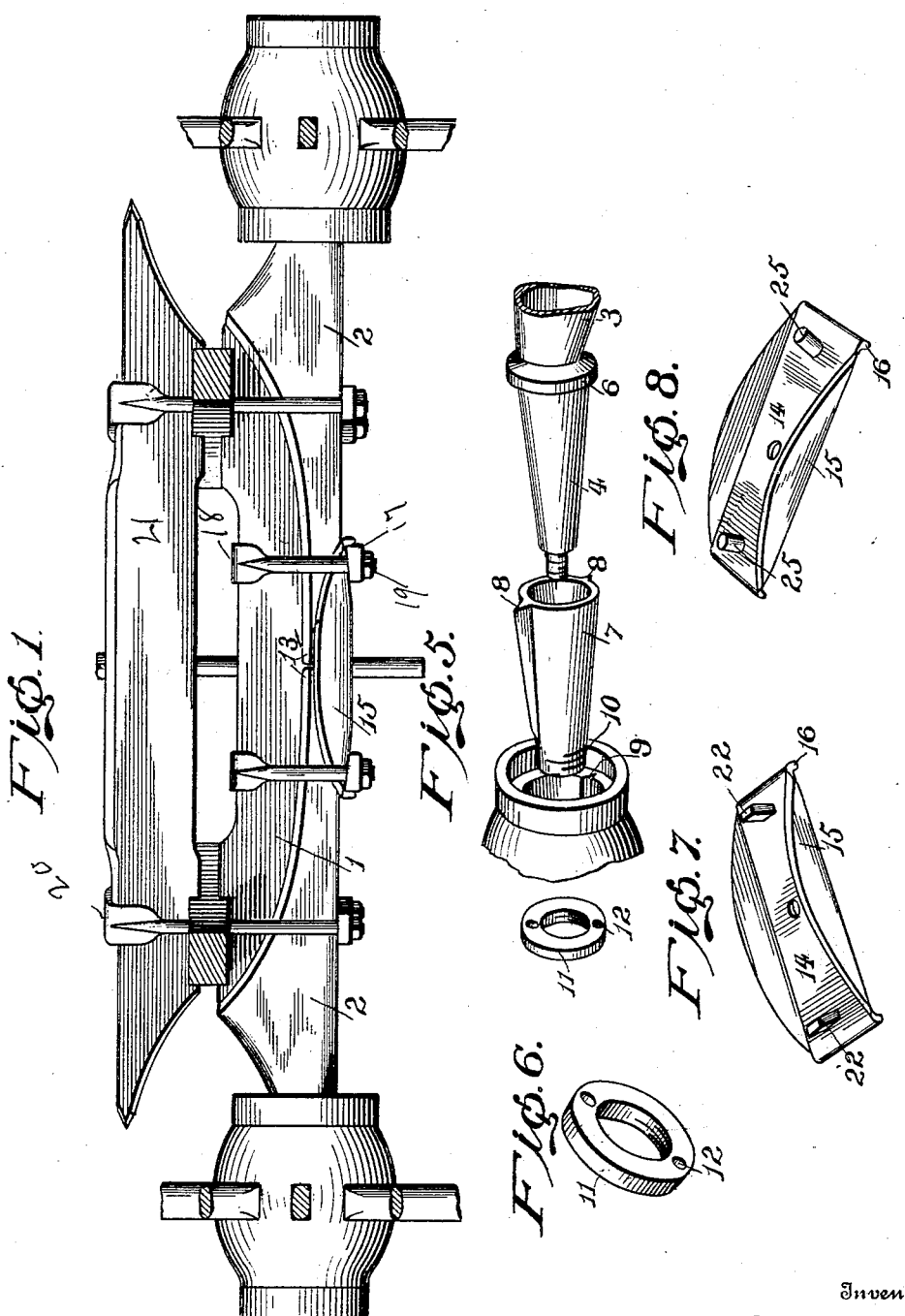
Witnesses
L. O. Handy
Geo. Hilton.
Inventor
RILEY McCLASKEY
By W. T. Fitzgerald
Attorneys.

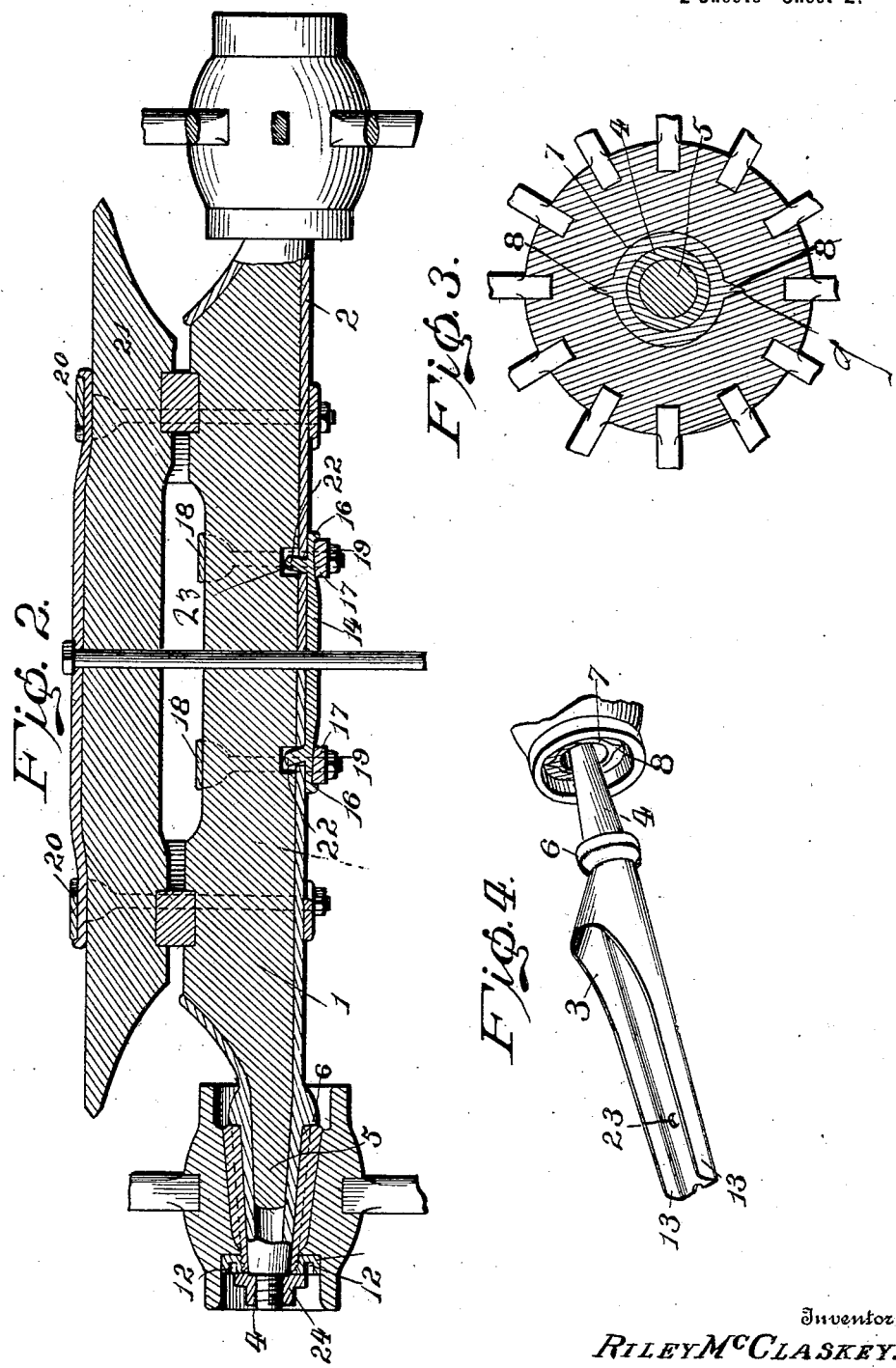

UNITED STATES PATENT OFFICE.

RILEY McCLASKEY, OF ROCKWOOD, WYOMING.

VEHICLE.

SPECIFICATION forming part of Letters Patent No. 677,585, dated July 2, 1901.

Application filed January 23, 1901. Serial No. 44,488. (No model.)

*To all whom it may concern:*

Be it known that I, RILEY McCLASKEY, a citizen of the United States, residing at Rockwood, in the county of Sheridan and State of Wyoming, have invented certain new and useful Improvements in Vehicles; and I do hereby declare the following to be a full, clear, and exact description of the invention, such as will enable others skilled in the art to which it appertains to make and use the same.

My invention relates to improvements in vehicles, and more particularly to a novel and desirable construction of the axles, one object being to provide a reliably-efficient metal reinforcement of the wooden portion, which will insure great strength and permanency.

A further object is to enable the parts to be readjusted should such result become desirable after long usage.

Other objects and advantages will be made fully apparent from the following description, considered in connection with the accompanying drawings, in which—

Figure 1 is a rear elevation showing the front axle in its finished operative condition. Fig. 2 is a longitudinal section of Fig. 1, also showing one of the wheels in section. Fig. 3 is a central transverse section of one of the hubs of the wheel and contiguous portion of the axle. Fig. 4 is a perspective view showing a portion of the wheel and one of the skeins employed to reinforce the wooden portion of the axle. Fig. 5 is a perspective detail view showing the end of the axle or axle-skein, the metal reinforcement of the hub, a portion of the hub ready to receive said metal reinforcement, and also the nut employed to hold the metal reinforcement in coöperative relationship with the hub. Fig. 6 is a perspective view, on a slightly-enlarged scale, of the nut employed to retain the metal reinforcement of the hub in its operative position. Fig. 7 is a perspective view of the plate employed to secure the inner ends of the reinforcing axle skeins or members in their adjusted operative positions. Fig. 8 is a perspective view of the same part shown in Fig. 7, illustrating a slightly-modified construction.

In order to conveniently refer to the several features of my invention and their coöperating accessories, numerals will be employed, of which 1 designates the axle proper, which is preferably made of wood, and since the same is most thoroughly and reliably reinforced by the metal casings or skeins 2 a poorer and lighter quality of timber may be used than would otherwise be possible.

I am aware that it is not an entirely new idea to inclose the wooden part of the axle in a metal casing; but I desire to call special attention to the means provided for securing the metallic jacket or casing upon the timber portion in such a way that the metal parts will be very securely held in their operative positions and capable of being easily separated and removed if such should for any reason become necessary.

The metallic casing or skein 2 is so shaped that it will provide the seat or hollow portion 3, which is designed to receive the end of the axle proper, 1, the latter being suitably shaped to fit in said opening 3 and extend outward through the hollow journal 4, as more clearly shown in Fig. 2, the extreme end of the axle being indicated by the numeral 5. The journal is provided at its inner end or at its point of union with the metallic casing 2 with the swell or collar 6, designed to limit the inward movement of the hub of the wheel, and designed to fit upon the journal 4 thus provided is the boxing 7, which is illustrated in detail in Fig. 5 and is provided upon opposite sides with the wings or flanges 8, designed to be received by longitudinally-disposed recesses or grooves 9, provided in the hub, and in order to reliably secure the boxing in place within the bore of the hub I provide the threads 10 on the tapered end of the boxing, which are designed to be received by a threaded aperture provided in the nut or locking-disk 11. The locking-disk 11 is also provided with the two notches or apertures 12, designed to receive the crotch-wrench, whereby the disk may be securely turned home upon the end of the boxing, and thereby lock the same securely within the bore of the hub without the necessity of employing any wedging or other common devices for holding it in place.

By the use of the locking-disk 11 it is obvious that the boxing may be very reliably locked in place and may at any time be tightened should the boxing become loose therein.

By the construction just described I am enabled to avoid the necessity of removing the wheel and driving wedges in place around the outer edge of the boxing, as is common when it is desirable to resecure the boxing in place.

It is well understood that when truing a boxing by driving wedges around the same it is quite difficult to keep the boxing truly in the center of the hub, thereby insuring that the wheel will be true upon the journal, whereas with the use of my invention all that is necessary to be done in case the boxing should become loose is to turn the locking-disk upon the threads 10, and thereby drive the boxing farther within the hub and insure that it will be locked therein.

The apertures 12 may, after the disk has been turned securely home, be employed to receive a nail or screw which may be entered in the contiguous part of the hub, and thereby insure that the disk will not casually rotate or become loose. The metallic jackets or skeins 2 may be tapered downward toward their inner ends, and thereby leave only the side flanges or upwardly-turned edges 13, and in order to lock the two jackets in their operative position I provide the metallic coupling 14, which is of proper width to snugly receive the inner ends of the casings 2 and is provided with the upwardly-curved flanges or lips 15, designed to inclose the meeting ends of the casings 2 and insure reliable reinforcement thereof and also provide a desirable finish for the parts. The coupling 14 is also provided at each end with the downwardly-curved lips 16, designed to hold the bridge-plate 17 against outward movement, said plate being held in place by the clip-bolts 18, engaged by the locking-nuts 19 in the usual manner. The casing or skeins 2 may also be additionally reinforced and secured by the clip-bolts 20, extending over the bolster 21 in the usual manner.

I desire to call attention to the construction of the coupling 14, which is illustrated in detail in Figs. 7 and 8 and wherein it will be seen that upon the inner surface of each end I provide the outwardly-inclined lugs 22, designed to fit in suitable apertures 23, provided near the inner ends of each of the casings or skeins 2. By reference to Fig. 2 it will be observed that the lugs 22, being slightly outwardly inclined, are adapted to enter the apertures 23 and when forced home therein will draw the skeins toward each other, and thereby securely lock the same in position. By this construction it will be possible to readjust the casings 2 upon their respective ends of the axle proper by placing a thin metallic wedge upon the inner face of the inclined lugs when it may be necessary to compensate for any shrinkage of the axle rendering readjustment necessary.

It will be understood that the lugs may be made as shown in Fig. 7 or round, as represented in Fig. 8, as may be deemed most desirable.

In Fig. 8 I have designated the lugs by the numeral 25, and if lugs of this character are employed it will be understood that the apertures 23 should be correspondingly formed, so as to snugly receive the lugs and prevent lateral movement of the coupling.

A comparatively light thin jacket or skein 2 may be made of steel, though said parts, as well as all of the others referred to, may be made of any preferred material deemed most suitable to meet the requirements of the varying situations, and while I have described the preferred construction and combination of the several elements presented it will be understood that I desire to comprehend in this application all substantial equivalents and substitutes as may be considered to fall fairly within the scope of my invention.

By reference to Fig. 2 it will be observed that the end of the journal is provided in the usual manner with the locking-nut 24, and said nut is so disposed that it will contact with the outer face of the locking-disk 11, and it is obvious that by interposing a leather washer between said members friction and wear may be reduced to a minimum.

In Fig. 2 I have shown the apertures 12 as extending only partly through the disk 11, though, as above stated, said apertures may extend entirely through the disk if they are to be used for receiving an anchoring screw or nail adapted to prevent the disk from casual reverse rotation when once locked in its operative position.

Having thus fully described the construction and manner of assembling the various parts of my invention, what I claim as new, and desire to secure by Letters Patent, is—

1. In an axle construction, the combination with the wooden portion of an axle proper, of metallic jackets or skeins adapted to receive each end thereof and a coupling having vertical side flanges to receive said axle and skeins and draw the latter toward each other, as set forth.

2. In vehicle construction, an axle; a metallic sleeve or casing adapted to receive each end of the axle; a journal carried by each sleeve and a coupling device having outwardly-inclined lugs adapted to engage apertures within the inner end of each of said casings whereby when said coupling is forced against said inner ends the latter will be drawn securely toward each other and retained until said coupling is removed, all substantially as specified and for the purpose set forth.

3. In a vehicle construction, the combination of skeins terminating in screw-threaded hollow journals and meeting in their centers with an axle, a coupling for said meeting ends, a boxing for the hollow journals having a screw-threaded end and a nut therefor, all arranged as set forth.

4. As an improvement in vehicle construction, the herein-described axle comprising the axle proper 1; metallic casings adapted to receive the end of the axle and having an integral journal upon the outer end thereof in combination with a coupling provided with outwardly-inclined lugs adapted to fit in suitable apertures provided for their reception in the inner end of the casings and suitable means to secure the coupling in place whereby the inclined lugs will be forced within the apertures and thereby draw the casings toward each other in the manner specified and for the purpose set forth.

In testimony whereof I affix my signature in presence of two witnesses.

RILEY McCLASKEY.

Witnesses:
 CLARENCE TOFFNER,
 ANDREW J. NIELSEN.